(12) United States Patent
Chou et al.

(10) Patent No.: US 11,837,886 B2
(45) Date of Patent: Dec. 5, 2023

(54) CHARGING DEVICE AND METHOD FOR POSITIONING ELECTRONIC DEVICE

(71) Applicant: LUXSHARE-ICT CO., LTD., Taipei (TW)

(72) Inventors: Shih Hsiao Chou, Taipei (TW); Kai Yuan Cheng, Taipei (TW); Ta Yu Lin, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 114 days.

(21) Appl. No.: 17/486,931

(22) Filed: Sep. 28, 2021

(65) Prior Publication Data

US 2022/0360119 A1    Nov. 10, 2022

(30) Foreign Application Priority Data

May 6, 2021    (CN) .......................... 202110491629.0

(51) Int. Cl.
*G01S 5/04*    (2006.01)
*H02J 50/90*    (2016.01)
*H04R 1/10*    (2006.01)

(52) U.S. Cl.
CPC ............... *H02J 50/90* (2016.02); *G01S 5/04* (2013.01); *H04R 1/1025* (2013.01)

(58) Field of Classification Search
CPC .. H02J 50/90; H02J 50/80; H02J 50/20; H02J 50/402; G01S 5/04; G01S 13/765; G01S 5/0284; G01S 3/48; G01S 5/12; H04R 1/1025; H04W 4/021; H04W 4/023; H04W 4/33
USPC ........................................................ 307/104
See application file for complete search history.

(56) References Cited

U.S. PATENT DOCUMENTS

| 10,148,097 B1* | 12/2018 | Leabman | ................ H02J 50/00 |
| 2020/0313725 A1* | 10/2020 | Abdulai | ............. H04B 17/0085 |
| 2020/0381844 A1* | 12/2020 | Kim | ........................ H01Q 3/28 |

FOREIGN PATENT DOCUMENTS

| CN | 106233768 | | 12/2016 |
| CN | 110753309 | * | 2/2020 |

* cited by examiner

*Primary Examiner* — Rexford N Barnie
*Assistant Examiner* — Xuan Ly
(74) *Attorney, Agent, or Firm* — JCIPRNET

(57) ABSTRACT

The disclosure provides a charging device and a method for positioning an electronic device. The method includes: in response to determining that a positioning request signal from an electronic device is received, enabling multiple antennas; controlling each antenna to receive a first radio frequency signal broadcast by the electronic device, and determining an arrival angle of the first radio frequency signal and a distance between the electronic device and the charging device based on the first radio frequency signal received by each antenna; and determining a relative position between the charging device and the electronic device based on the arrival angle and distance.

15 Claims, 8 Drawing Sheets

CHARGING DEVICE AND METHOD FOR POSITIONING ELECTRONIC DEVICE

CROSS-REFERENCE TO RELATED APPLICATION

This application claims the priority benefit of China application serial no. 202110491629.0, filed on May 6, 2021. The entirety of the above-mentioned patent application is hereby incorporated by reference herein and made a part of this specification.

BACKGROUND

Technical Field

The disclosure relates to a positioning technique, and in particular, to a charging device and a method for positioning an electronic device.

Description of Related Art

As technology advances, wireless Bluetooth earphones have become the mainstream in the development of Bluetooth earphones. To prevent users from not being able to charge their wireless Bluetooth earphones because of losing the charging cases of the wireless Bluetooth earphones, many positioning techniques regarding charging cases of wireless Bluetooth earphones are available in the current technology.

However, most of the positioning techniques above have to be executed based on the Global Positioning System (GPS) coordinates, which not only limits them to an outdoor environment but also makes them have lower precision (only about a couple of meters).

Therefore, for persons skilled in the art, how to design a mechanism which positions a charging case with high precision in an indoor environment is an important issue to work on.

SUMMARY

Accordingly, the disclosure is directed to a charging device and a method for positioning an electronic device, which solves the technical problem above.

The disclosure provides a charging device, which is paired to an electronic device and includes a processor and multiple antennas. The processor is coupled to the antennas and is configured to execute the following. In response to determining that a positioning request signal from the electronic device is received, the antennas are enabled. Each of the antennas is controlled to receive a first radio frequency signal broadcast by the electronic device, and an arrival angle of the first radio frequency signal and a distance between the electronic device and the charging device are determined based on the first radio frequency signal received by each of the antennas. A relative position between the charging device and the electronic device is determined based on the arrival angle and the distance.

The disclosure provides a method for positioning an electronic device. The method is adapted for a charging device paired to the electronic device. The charging device includes multiple antennas and a processor. The method includes the following. In response to determining that a positioning request signal from an electronic device is received, the antennas are enabled. Each of the antennas is controlled to receive a first radio frequency signal broadcast by the electronic device, and an arrival angle of the first radio frequency signal and a distance between the electronic device and the charging device are determined based on the first radio frequency signal received by each of the antennas. A relative position between the charging device and the electronic device is determined based on the arrival angle and the distance.

DESCRIPTION OF THE EMBODIMENTS

Figure 1:
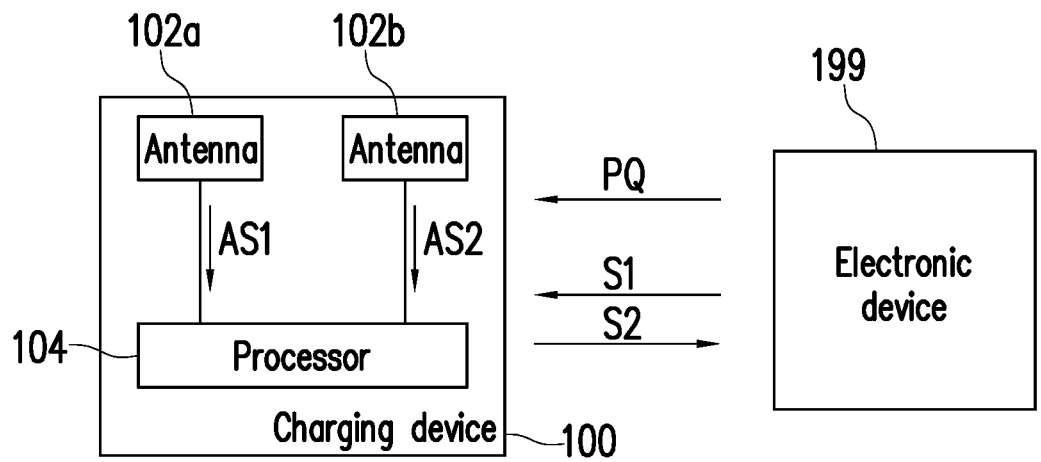
FIG. 1 is a schematic diagram of a charging device and an electronic device according to an embodiment of the disclosure.

Referring to FIG. 1, FIG. 1 is a schematic diagram of a charging device and an electronic device according to an embodiment of the disclosure. In different embodiments, an electronic device 199 may be realized as various computer devices or smart devices, but it is not limited thereto. A charging device 100 may be, for example, a device configured to charge various electronic devices and to be paired to the electronic device 199 though any wireless communication protocol (for example, a Bluetooth protocol). To facilitate understanding, in the following, the charging device 100 is assumed to be a charging case configured to charge a corresponding wireless earphone set, but it is not limited thereto.

As shown in FIG. 1, the charging device 100 may include, for example, an antenna 102a, an antenna 102b, and a processor 104. In different embodiments, the processor 104 is coupled to the antenna 102a and the antenna 102b and may be a general-purpose processor, a special-purpose processor, a conventional processor, a digital signal processor, multiple microprocessors, one or more microprocessors combined with a core of a digital signal processor, a controller, a microcontroller, an application specific integrated circuit (ASIC), a field programmable gate array (FPGA), a system in package (SIP), or any other type of integrated circuit, state machine, processor based on an advanced RISC machine (ARM), or the like. In the embodiments of the disclosure, the processor 104, the antenna 102a, and the antenna 102b may be, for example but not limited to, integrated in a positioning circuit of the charging device 100.

In an embodiment, the processor 104 may access a certain software module or code to realize the method for positioning an electronic device provided in the disclosure. The details thereof are described below.

Figure 2:
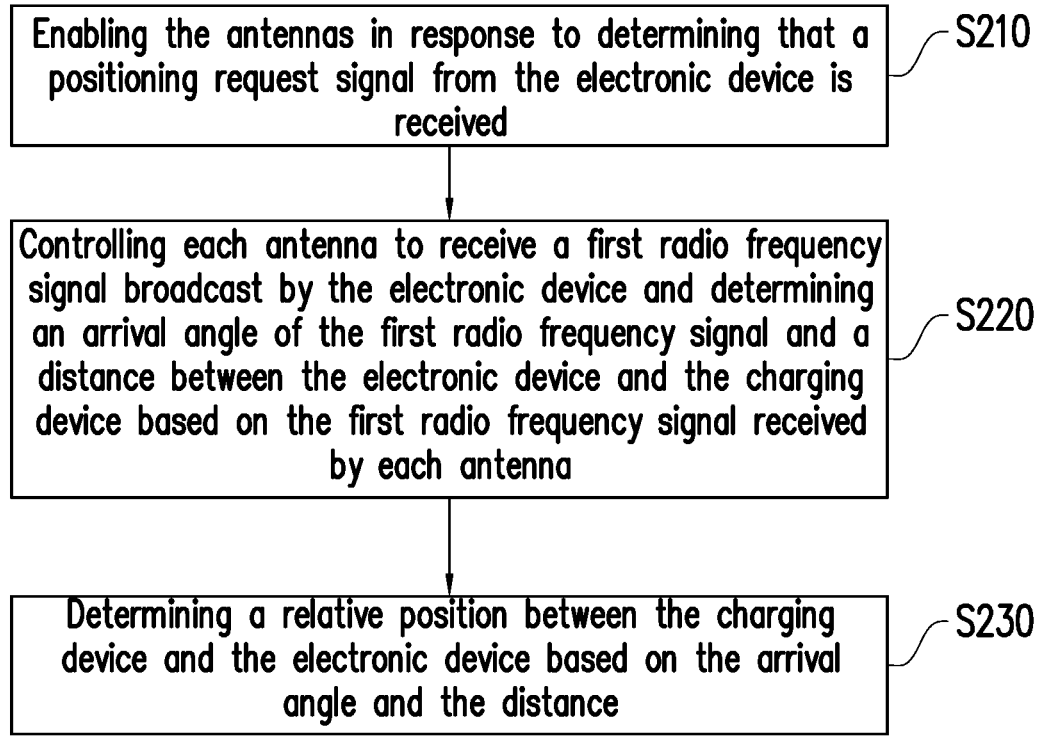
FIG. 2 is a flow chart of a method for positioning an electronic device according to an embodiment of the disclosure.

Referring to FIG. 2, FIG. 2 is a flow chart of a method for positioning an electronic device according to an embodiment of the disclosure. The method of the disclosure may be executed by the charging device 100 in FIG. 1. Each step in FIG. 2 is described in detail with reference to the elements shown in FIG. 1 below.

In an embodiment, when a user of the electronic device 199 desires to locate the charging device 100, the user may, for example but not limited to, transmit a positioning request signal PQ to the charging device 100 by operating an application corresponding to the charging device 100 on the electronic device 199.

In brief, when the positioning request signal PQ is received, the charging device 100 may correspondingly position the electronic device 199 and return a related positioning result (for example, a relative position between the charging device 100 and the electronic device 199) to the electronic device 199. Correspondingly, the electronic device 199 may obtain a position where the charging device 100 is located based on the positioning result so that the user may locate the charging device 100 based on the information provided by the electronic device 199. The details thereof are described below.

First, in step S210, in response to determining that the positioning request signal PQ from the electronic device 199 is received, the processor 104 may enable the antenna 102a and the antenna 102b.

Next, in step S220, the processor 104 may control each of the antenna 102a and the antenna 102b to receive a first radio frequency signal S1 broadcast by the electronic device 199 and determine an arrival angle θ of the first radio frequency signal S1 and a distance R between the electronic device 199 and the charging device 100 based on the first radio frequency signal S1 received by each of the antenna 102a and the antenna 102b. In this embodiment, the electronic device 199 uses a broadcasting channel to transmit signals.

In different embodiments, the charging device 100 may obtain the arrival angle of the first radio frequency signal S1 and the distance between the electronic device 199 and the charging device 100 through different ways. Details thereof are described further with reference to different embodiments.

Referring to FIG. 3A to FIG. 3E, FIG. 3A is a flow chart of determining the arrival angle according to the first embodiment of the disclosure, and FIG. 3B to FIG. 3E are diagrams illustrating an application scenario of determining the arrival angle according to the first embodiment of the disclosure.

In step S310, the antenna 102a may provide a first antenna signal AS1 to the processor 104 in response to receiving the first radio frequency signal S1. In step S320, the antenna 102b may provide a second antenna signal AS2 to the processor 104 in response to receiving the first radio frequency signal S1.

Figure 3A:
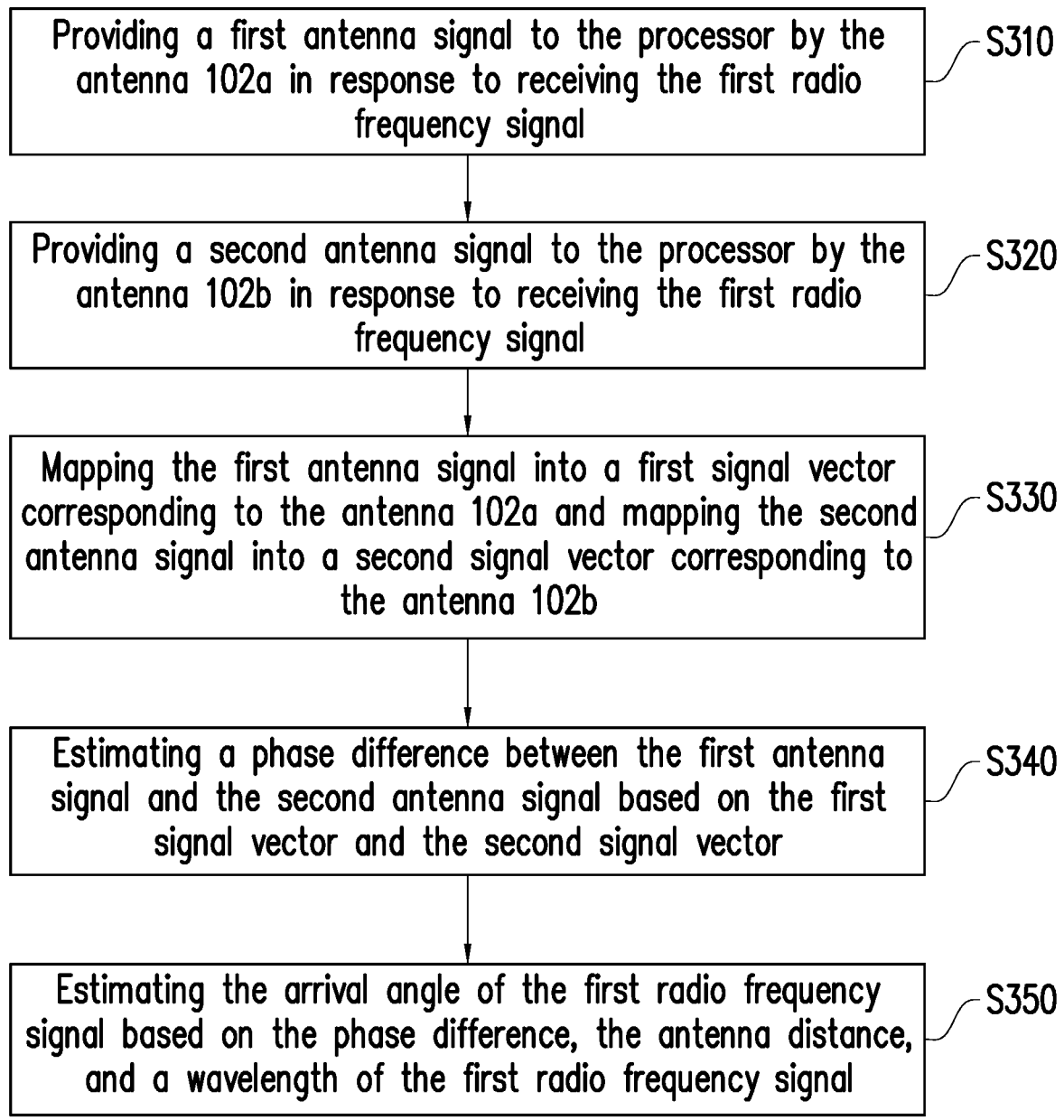
FIG. 3A is a flow chart of determining the arrival angle according to the first embodiment of the disclosure.
Figure 3B:
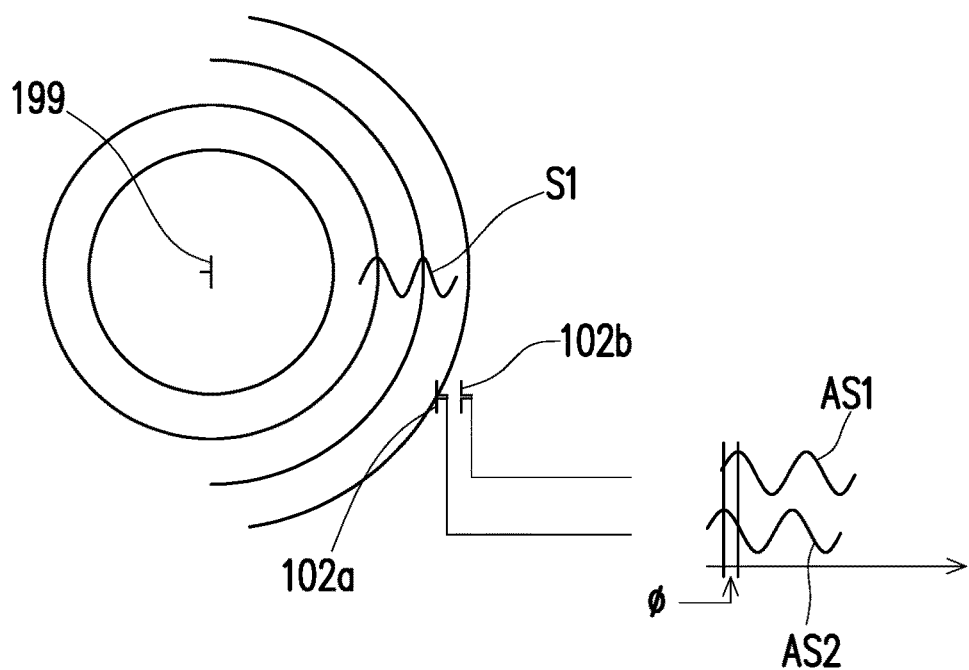
FIG. 3B to FIG. 3E are diagrams illustrating an application scenario of determining the arrival angle according to the first embodiment of the disclosure.
Figure 3C:
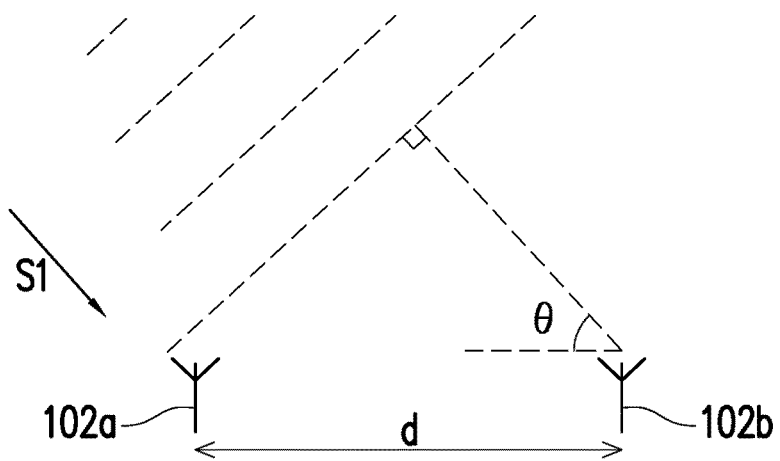

As shown in FIG. 3B and FIG. 3C, when the electronic device 199 transmits the first radio frequency signal S1, the first radio frequency signal S1 may, for example, travel to the charging device 100 in a way of an electromagnetic wave. Since an antenna distance d is present between the antenna 102a and the antenna 102b, the first radio frequency signal S1 arrives at the antenna 102a and the antenna 102b at different points in time so that, correspondingly, a phase difference ϕ is present between the first antenna signal AS1 and the second antenna signal AS2. In different embodiments, the antenna distance d may be approximately between 61.5 mm and 10 mm, but it is not limited thereto.

Figure 3D:
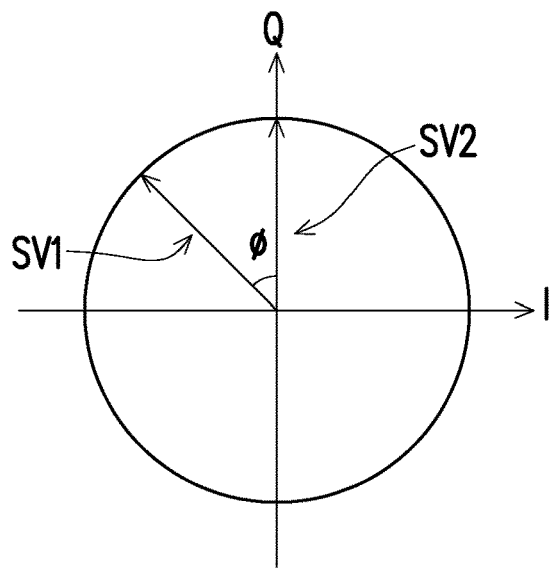

Next, in step S330, the processor 104 may map the first antenna signal AS1 into a first signal vector SV1 corresponding to the antenna 102a and map the second antenna signal AS2 into a second signal vector SV2 corresponding to the antenna 102b, as shown in FIG. 3D. As shown in FIG. 3D, a phase difference ϕ is also present between the first signal vector SV1 and the second signal vector SV2, and the first signal vector SV1 and the second signal vector SV2 may be, but are not limited to, plane vectors.

Next, in step S340, the processor 104 may estimate the phase difference ϕ between the first antenna signal AS1 and the second antenna signal AS2 based on the first signal vector SV1 and the second signal vector SV2. In the embodiments of the disclosure, with regard to the details of steps S330 and S340, related literature about antenna signal processing techniques may be referred to, and the details are not described here.

Figure 3E:
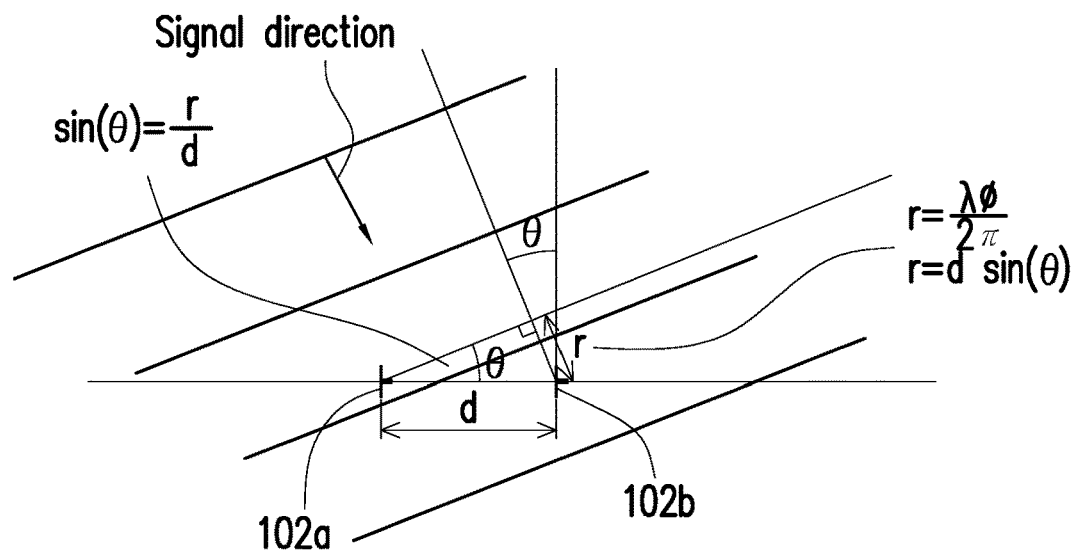

In step S350, the processor 104 may estimate the arrival angle θ of the first radio frequency signal S1 based on the phase difference ϕ, the antenna distance d, and a wavelength (denoted by λ) of the first radio frequency signal S1. In FIG. 3E, the arrival angle θ of the first radio frequency signal S1 may be obtained, for example but not limited to, based on an equation $$\theta = \arcsin \frac{\phi \lambda}{2\pi d}.$$

Note that, despite assuming that the charging device 100 includes two antennas 102a and 102b configured to position the electronic device 199 in all the embodiments above, in other embodiments, the charging device 100 (in its positioning circuit) may also include more antennas so as to increase the detection accuracy of the Z-axis. In different embodiments, the antennas may be arranged in any way based on a demand of a designer. For example, the antennas may be arranged, for example but not limited to, into an M×N array (M and N are integers) or a circular antenna array.

Figure 4A:
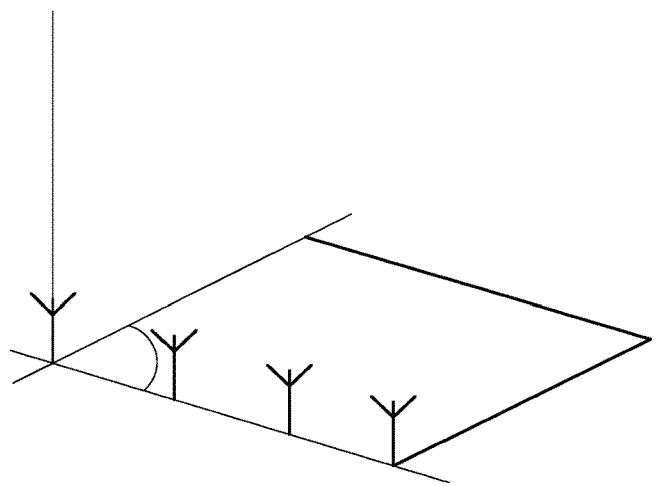
FIG. 4A to FIG. 4C are schematic diagrams illustrating various antenna arrangements according to different embodiments of the disclosure.
Figure 4B:
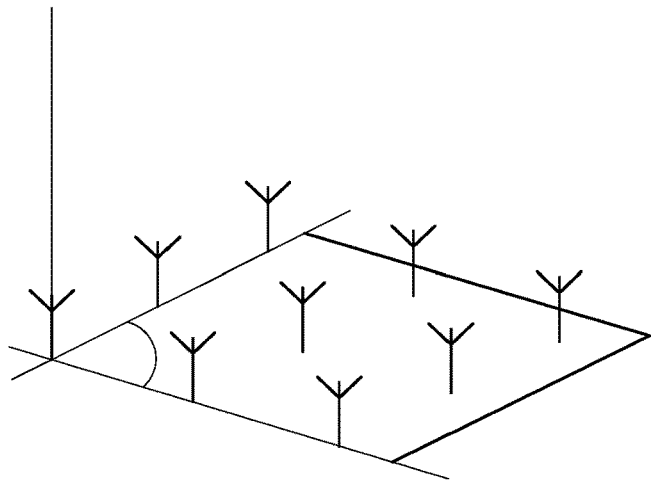
Figure 4C:
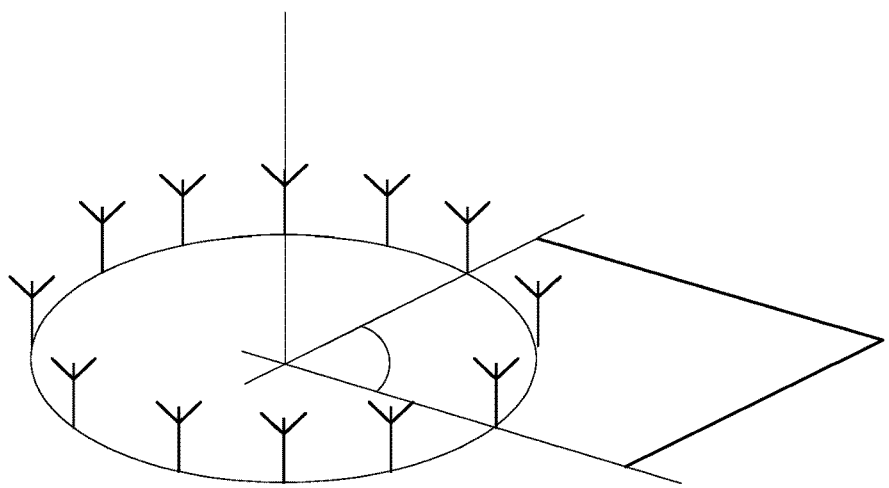

Referring to FIG. 4A to FIG. 4C, FIG. 4A to FIG. 4C are schematic diagrams illustrating various antenna arrangements according to different embodiments of the disclosure. In FIG. 4A, the charging device 100 may include, for example, four antennas as shown which are arranged, for example, into a 4×1 array. Furthermore, in FIG. 4B, the charging device 100 may include, for example, nine antennas as shown which are arranged, for example, into a 3×3 array. In FIG. 4C, the charging device 100 may include, for example, 12 antennas as shown which are arranged, for example, into a circular antenna array.

When the antennas included in the charging device 100 are disposed in any way shown in FIG. 4A to FIG. 4C, the processor 104 may still obtain the arrival angle θ of the first radio frequency signal S1 based on the mechanisms taught in FIG. 3A to FIG. 3E. The descriptions of the embodiments above may be referred to for more details.

Figure 5A:
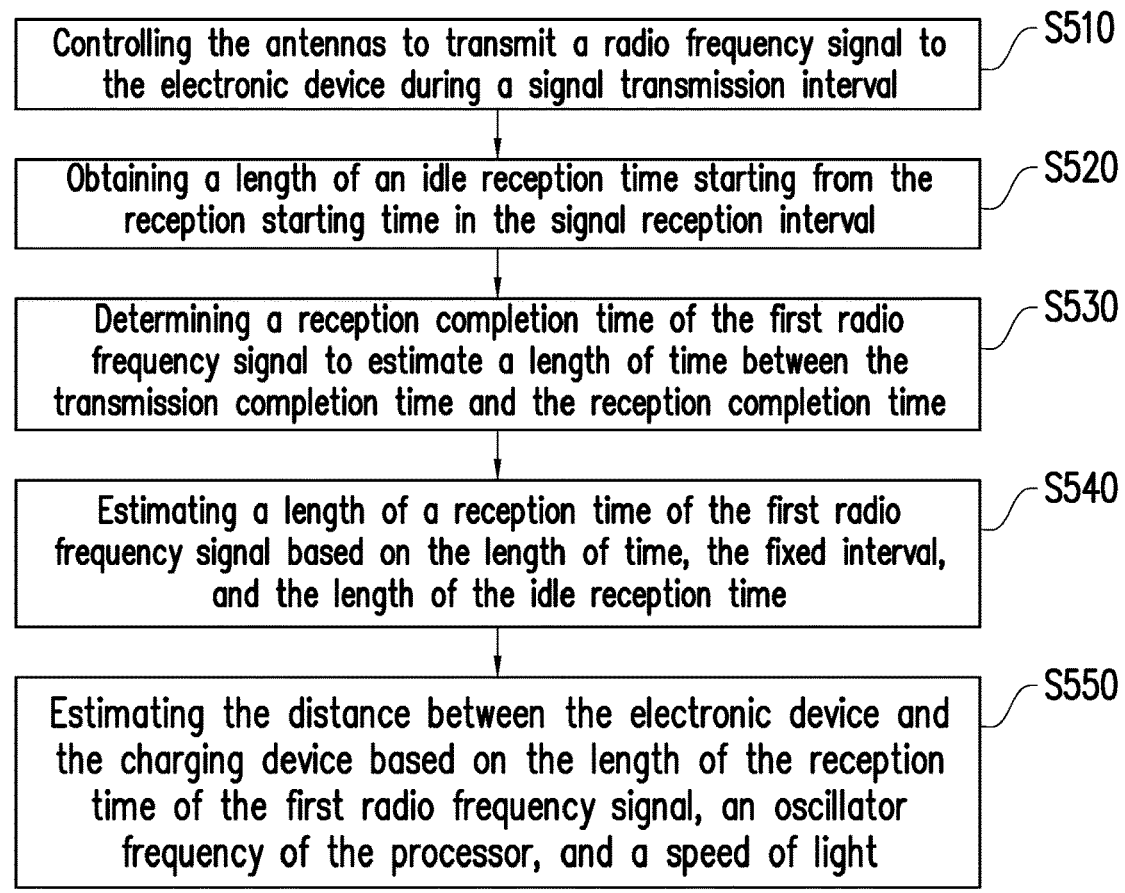
FIG. 5A is a flow chart of determining the distance between the charging device and the electronic device according to the second embodiment of the disclosure.
Figure 5B:
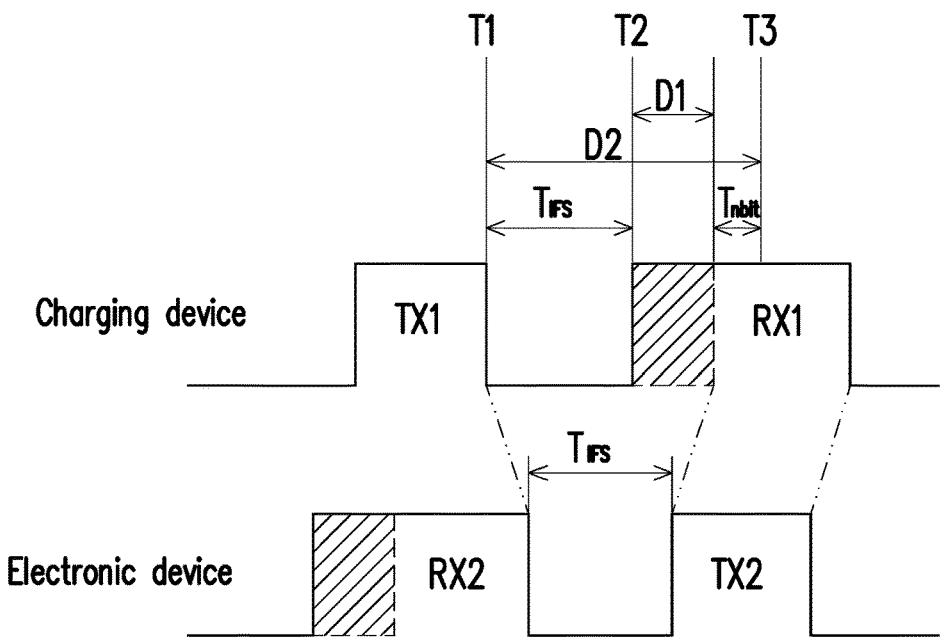
FIG. 5B is a diagram illustrating an application scenario of determining the distance between the charging device and the electronic device according to the second embodiment of the disclosure.

Referring to FIG. 5A and FIG. 5B, FIG. 5A is a flow chart of determining the distance between the charging device and the electronic device according to the second embodiment of the disclosure, and FIG. 5B is a diagram illustrating an application scenario of determining the distance between the charging device and the electronic device according to the second embodiment of the disclosure.

In the second embodiment, the charging device 100, for example, may execute step S510 so as to control the antenna 102a and/or the antenna 102b to transmit a second radio frequency signal S2 to the electronic device 199 during a signal transmission interval TX1 (which may include a transmission completion time T1). Correspondingly, the electronic 199, for example, may receive the second radio frequency signal S2 from the charging device 100 during a signal reception interval RX2.

In addition, in response to the second radio frequency signal S2, the electronic device 199 may return the first radio frequency signal S1 to the charging device 100 during a signal transmission interval TX2. Correspondingly, the charging device 100 may receive the first radio frequency signal S1 from the electronic device 199 during a signal reception interval RX1 (which may include a reception starting time T2).

In other words, for the charging device 100, the charging device 100 may alternately transmit the second radio frequency signal S2 to the electronic device 199 during the signal transmission interval TX1 and receive the first radio frequency signal S1 from the electronic device 199 during the signal reception interval RX1. In the second embodiment, for example, a fixed interval $T_{IFS}$ may be present between the signal transmission interval TX1 and the signal reception interval RX1, which is a time difference between the transmission completion time T1 and the reception starting time T2. Similarly, the fixed interval $T_{IFS}$ may also be present between the signal reception interval RX2 and the signal transmission interval TX2, but the disclosure is not limited thereto.

Next, in step S520, the processor 104 may obtain a length of an idle reception time D1 starting from reception starting time T2 in the signal reception interval RX1. In an embodiment, when the processor 104 receives the first radio frequency signal S1, for example, the signal reception has to be completed with a fixed time period for verifying the reception (e.g., 49.5 μs), and the time period for verifying the reception is the length of the idle reception time D1. However, the disclosure is not limited thereto.

In step S530, the processor 104 may determine a reception completion time T3 of the first radio frequency signal S1 to estimate a length of time D2 between the transmission completion time T1 and the reception completion time T3.

In step S540, the processor 104 may estimate a length of a reception time $T_{nbit}$ of the first radio frequency signal S1 based on the length of time D2, the fixed interval $T_{IFS}$, and the length of the idle reception time D1. In FIG. 5B, the processor 104 may estimate the length of the reception time $T_{nbit}$ of the first radio frequency signal S1 by subtracting the fixed interval $T_{IFS}$ and the length of the idle reception time D1 from the length of time D2. However, the disclosure is not limited thereto.

In step S550, the processor 104 may estimate the distance R between the electronic device 199 and the charging device 100 based on the length of the reception time $T_{nbit}$ of the first radio frequency signal S1, an oscillator frequency (denoted by OF) of the processor 104, and a speed of light (denoted by c). In an embodiment, the distance R may be estimated and obtained, for example, based on an equation $$R = \frac{1}{2} \times \frac{T_{nbit}}{OF} \times c.$$

For example, assuming that the oscillator frequency of the processor 104 is 8 MHz, and the speed of light is 3×10⁸ m/s, the distance R may be calculated, for example but not limited to, from an equation $$\frac{1}{2} \times \frac{T_{nbit}}{8\,\text{MHz}} \times 3 \times 10^8 \frac{m}{s} = 18.75 \text{ m} \times T_{nbit}.$$

Figure 6A:
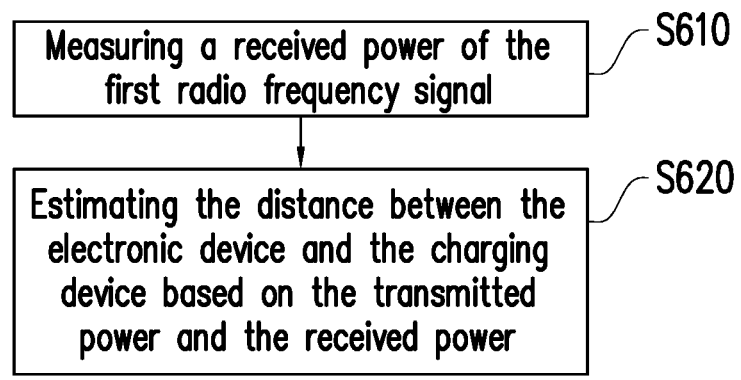
FIG. 6A is a flow chart of determining the distance between the charging device and the electronic device according to the third embodiment of the disclosure.
Figure 6B:
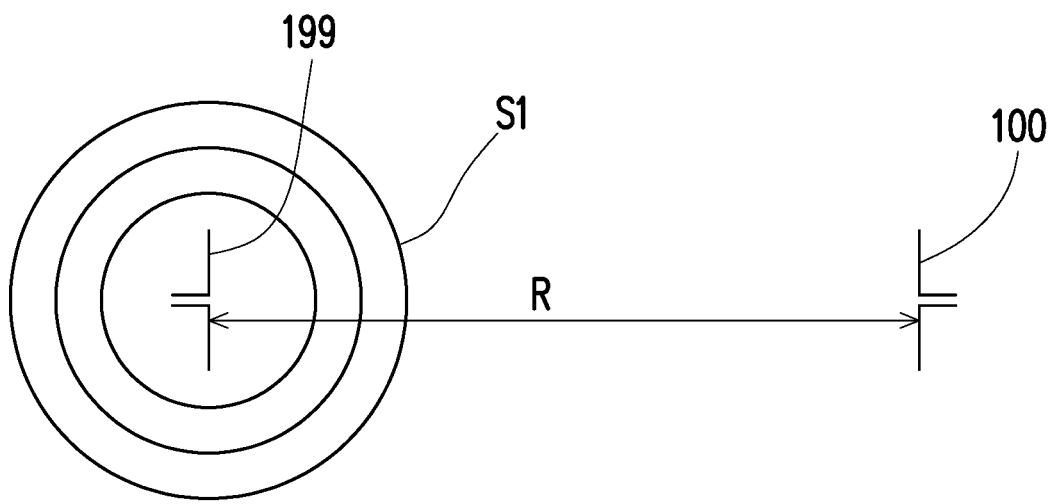
FIG. 6B is a diagram illustrating an application scenario of determining the distance between the charging device and the electronic device according to the third embodiment of the disclosure.

Referring to FIG. 6A and FIG. 6B, FIG. 6A is a flow chart of determining the distance between the charging device and the electronic device according to the third embodiment of the disclosure, and FIG. 6B is a diagram illustrating an application scenario of determining the distance between the charging device and the electronic device according to the third embodiment of the disclosure.

In the third embodiment, assuming that the electronic device 199 is designed to transmit the first radio frequency signal S1 at a transmitted power (denoted by Pt), and the transmitted power is known for the processor 104. In this case, the processor 104 may measure a received power (denoted by Pr) of the first radio frequency signal S1 in step S610. Next, in step S620, the processor 104 may estimate the distance R between the electronic device 199 and the charging device 100 based on the transmitted power and the received power. In an embodiment, the processor 104 may, for example but not limited to, estimate the distance R between the electronic device 199 and the charging device 100 based on an equation $$R = \sqrt{\frac{Pt}{4\pi Pr}}.$$

Referring again to FIG. 2, after the distance R between the electronic device 199 and the charging device 100 and the arrival angle θ of the first radio frequency signal S1 are obtained based on the teaching above, in step S230, the processor 104 may determine the relative position between the charging device 100 and the electronic device 199 based on the arrival angle θ and the distance R. For example, the charging device 100 may obtain in which direction of the charging device 100 the electronic device 199 is located based on the arrival angle θ and estimate a specific position of the electronic device 199 based on the distance R.

In an embodiment, the processor 104 may further inform the electronic device 199 of the relative position between the charging device 100 and the electronic device 199. Accordingly, the electronic device 199 may correspondingly obtain a position where the charging device 100 is located so that the user may successfully locate the charging device 100.

Figure 7:
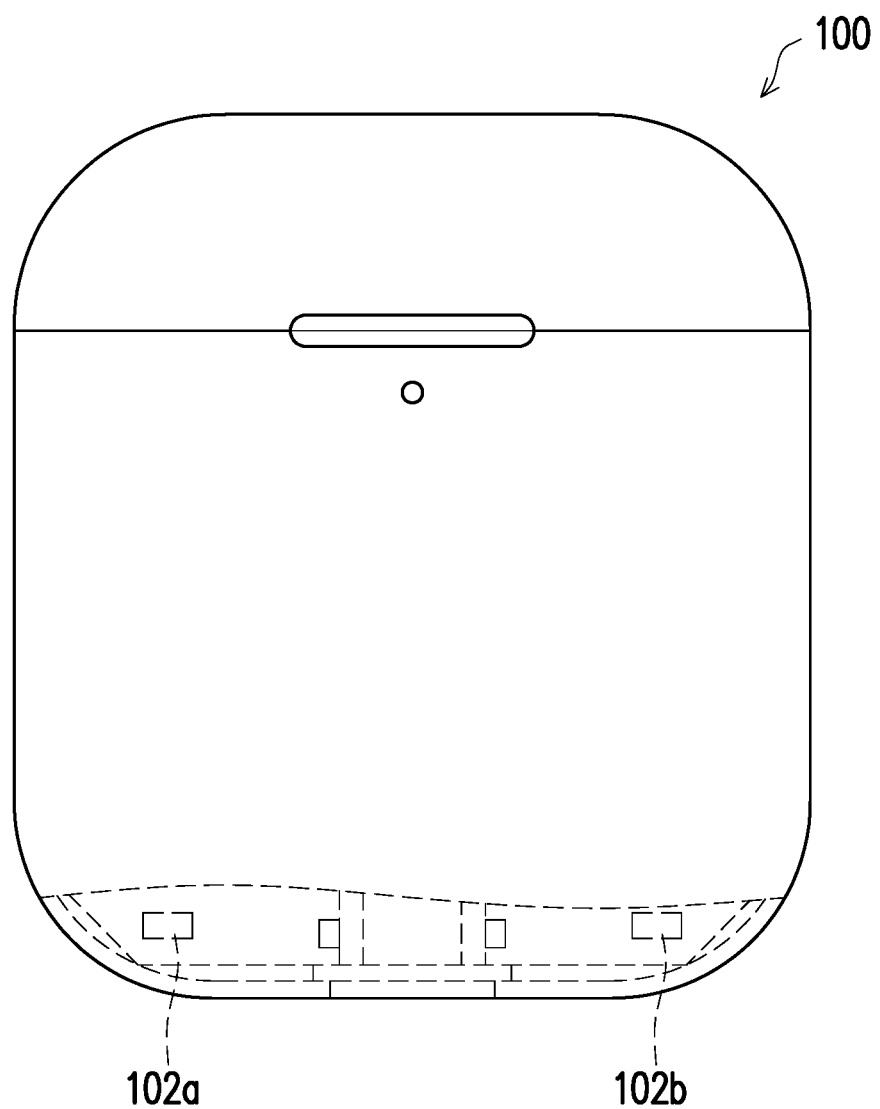
FIG. 7 is a partially see-through diagram of the charging device according to an embodiment of the disclosure.

Referring to FIG. 7, FIG. 7 is a partially see-through diagram of the charging device according to an embodiment of the disclosure. In FIG. 7, the charging device 100 is, for example but not limited to, a charging case of a pair of wireless Bluetooth earphones. As shown in FIG. 7, the antenna 102a and the antenna 102b of the embodiment may be disposed, for example but not limited to, at the position as shown.

In addition, in different embodiments, in response to the difference of the communication protocols between the charging device 100 and the electronic device 199, the charging device 100 may have different detection areas. For example, assuming that the charging device 100 and the electronic device 199 are paired based on the Bluetooth low energy (BLE) protocol, the charging device 100 can successfully detect the electronic device 199 when the distance R is less than 30 meters. Furthermore, if the charging device 100 and the electronic device 199 are paired based on a general version of a Bluetooth protocol, the charging device 100 can successfully detect the electronic device 199 if the distance R is less than 50 meters.

In light of the above, the charging device provided by the disclosure estimates the relative position between the charging device and the electronic device based on the radio frequency signal from the electronic device through an additionally-disposed positioning circuit. Compared with the positioning techniques executed based on GPS coordinates, the method provided by the disclosure achieves better positioning precision and is suitable for an indoor environment. Accordingly, a user may successfully locate the charging device based on a more precise relative position between the charging device and the electronic device so that the user experience is improved.

It will be apparent to those skilled in the art that various modifications and variations can be made to the embodiments of the disclosure without departing from the scope or spirit of the disclosure. Accordingly, the scope of the disclosure will be defined by the attached claims and their equivalents and not by the above detailed descriptions.

What is claimed is:

1. A charging device paired to an electronic device and comprising:
    a plurality of antennas;
    a processor coupled to the antennas and configured to execute the following:
        enabling the antennas in response to determining that a positioning request signal from the electronic device is received;
    controlling each of the antennas to receive a first radio frequency signal broadcast by the electronic device and determining an arrival angle of the first radio frequency signal and a distance between the electronic device and the charging device based on the first radio frequency signal received by each of the antennas, wherein the antennas comprise:
        a first antenna providing a first antenna signal to the processor in response to receiving the first radio frequency signal;
        a second antenna being an antenna distance away from the first antenna and providing a second antenna signal to the processor in response to receiving the first radio frequency signal, wherein
        the processor is configured to:
            map the first antenna signal into a first signal vector corresponding to the first antenna and map the second antenna signal into a second signal vector corresponding to the second antenna;
            estimate a phase difference between the first antenna signal and the second antenna signal based on the first signal vector and the second signal vector; and
            estimate the arrival angle of the first radio frequency signal based on the phase difference, the antenna distance, and a wavelength of the first radio frequency signal; and
        determining a relative position between the charging device and the electronic device based on the arrival angle and the distance.

2. The charging device according to claim 1, wherein the antennas and the processor are integrated in a positioning circuit of the charging device.

3. The charging device according to claim 1, wherein the processor is configured to control each of the antennas to receive the first radio frequency signal broadcast by the electronic device during a signal reception interval, the signal reception interval has a reception starting time, and, before controlling each of the antennas to receive the first radio frequency signal broadcast by the electronic device during the signal reception interval, the processor is further configured to:
    control the antennas to transmit a second radio frequency signal to the electronic device during a signal transmission interval before the signal reception interval, wherein the signal transmission interval has a transmission completion time, a fixed interval is present between the transmission completion time of the signal transmission interval and the reception starting time of the signal reception interval, and the electronic device returns the first radio frequency signal to the charging device in response to the second radio frequency signal;
    obtain a length of an idle reception time starting from the reception starting time in the signal reception interval;
    determine a reception completion time of the first radio frequency signal to estimate a length of time between the transmission completion time and the reception completion time;
    estimate a length of a reception time of the first radio frequency signal based on the length of time, the fixed interval, and the length of the idle reception time; and
    estimate the distance between the electronic device and the charging device based on the length of the reception time of the first radio frequency signal, an oscillator frequency of the processor, and a speed of light.

4. The charging device according to claim 1, wherein a transmitted power of the first radio frequency signal is known for the processor, and the processor is configured to measure a received power of the first radio frequency signal and estimate the distance between the electronic device and the charging device based on the transmitted power and the received power.

5. The charging device according to claim 1, wherein the antennas are arranged into an M×N array.

6. The charging device according to claim 1, wherein the antennas are arranged into a circular antenna array.

7. The charging device according to claim 1, wherein the charging device is a charging case of a wireless earphone set.

8. The charging device according to claim 1, wherein an antenna distance is present between every two antennas of the antennas.

9. The charging device according to claim 8, wherein the antenna distance is between 61.5 mm and 10 mm.

10. The charging device according to claim 1, wherein the processor further informs the electronic device of the relative position.

11. A method for positioning an electronic device adapted for a charging device paired to the electronic device, wherein the charging device comprises a plurality of antennas and a processor, and the method comprises:
    enabling the antennas in response to determining that a positioning request signal from the electronic device is received;

controlling each of the antennas to receive a first radio frequency signal broadcast by the electronic device and determining an arrival angle of the first radio frequency signal and a distance between the electronic device and the charging device based on the first radio frequency signal received by each of the antennas, wherein the antennas comprise a first antenna and a second antenna, and the method comprises:
  providing a first antenna signal to the processor by the first antenna in response to receiving the first radio frequency signal;
  providing a second antenna signal to the processor by the second antenna in response to receiving the first radio frequency signal, wherein the second antenna is an antenna distance away from the first antenna;
  mapping the first antenna signal into a first signal vector corresponding to the first antenna and mapping the second antenna signal into a second signal vector corresponding to the second antenna;
  estimating a phase difference between the first antenna signal and the second antenna signal based on the first signal vector and the second signal vector; and
  estimating the arrival angle of the first radio frequency signal based on the phase difference, the antenna distance, and a wavelength of the first radio frequency signal; and
determining a relative position between the charging device and the electronic device based on the arrival angle and the distance.

12. The method according to claim 11, wherein the antennas and the processor are integrated in a positioning circuit of the charging device.

13. The method according to claim 11, further comprising:
  controlling each of the antennas to receive the first radio frequency signal broadcast by the electronic device during a signal reception interval, wherein the signal reception interval has a reception starting time, and, before controlling each of the antennas to receive the first radio frequency signal broadcast by the electronic device during the signal reception interval, the method further comprises:
controlling the antennas to transmit a second radio frequency signal to the electronic device during a signal transmission interval before the signal reception interval, wherein the signal transmission interval has a transmission completion time, a fixed interval is present between the transmission completion time of the signal transmission interval and the reception starting time of the signal reception interval, and the electronic device returns the first radio frequency signal to the charging device in response to the second radio frequency signal;
obtaining a length of an idle reception time starting from the reception starting time in the signal reception interval;
determining a reception completion time of the first radio frequency signal to estimate a length of time between the transmission completion time and the reception completion time;
estimating a length of a reception time of the first radio frequency signal based on the length of time, the fixed interval, and the length of the idle reception time; and
estimating the distance between the electronic device and the charging device based on the length of the reception time of the first radio frequency signal, an oscillator frequency of the processor, and a speed of light.

14. The method according to claim 11, wherein a transmitted power of the first radio frequency signal is known for the processor and the method comprises:
  measuring a received power of the first radio frequency signal and estimating the distance between the electronic device and the charging device based on the transmitted power and the received power.

15. The method according to claim 11, further comprising informing the electronic device of the relative position.

* * * * *